Oct. 20, 1931.  M. L. JACKSON ET AL  1,828,188
DISPENSING, MEASURING, AND COMPUTING DEVICE
Filed Sept. 2, 1930   3 Sheets-Sheet 2
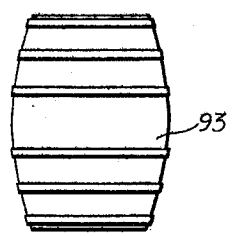
Fig. 6
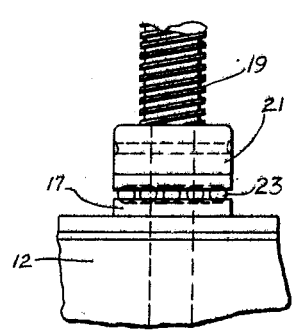
Fig. 5
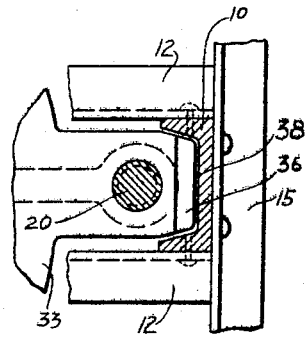
Fig. 4
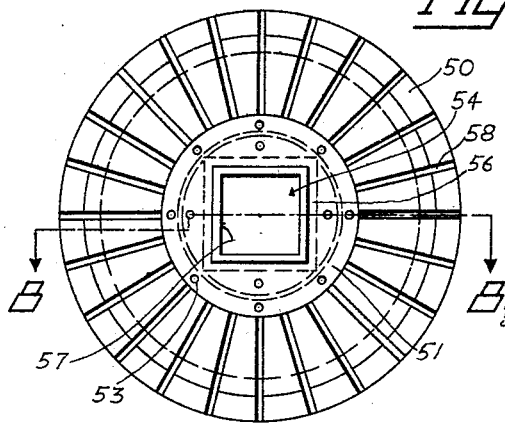
Fig. 7
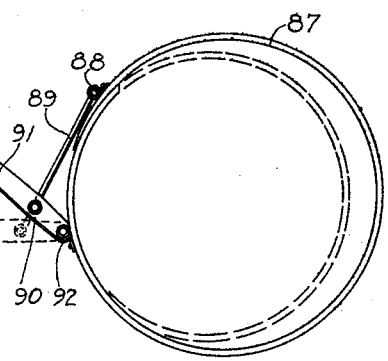
Fig. 9
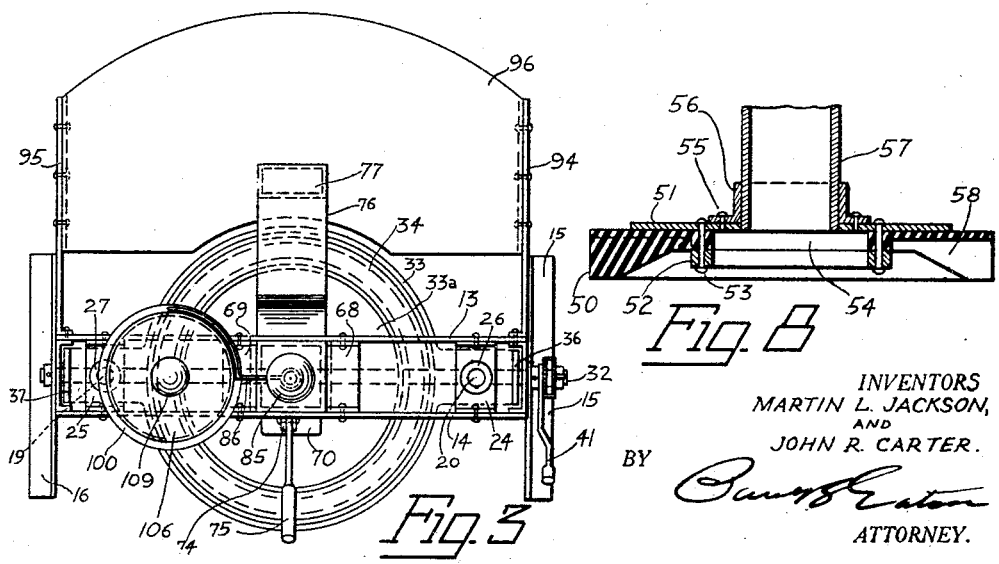
Fig. 8
Fig. 3
INVENTORS
MARTIN L. JACKSON,
AND
JOHN R. CARTER.
BY
ATTORNEY.

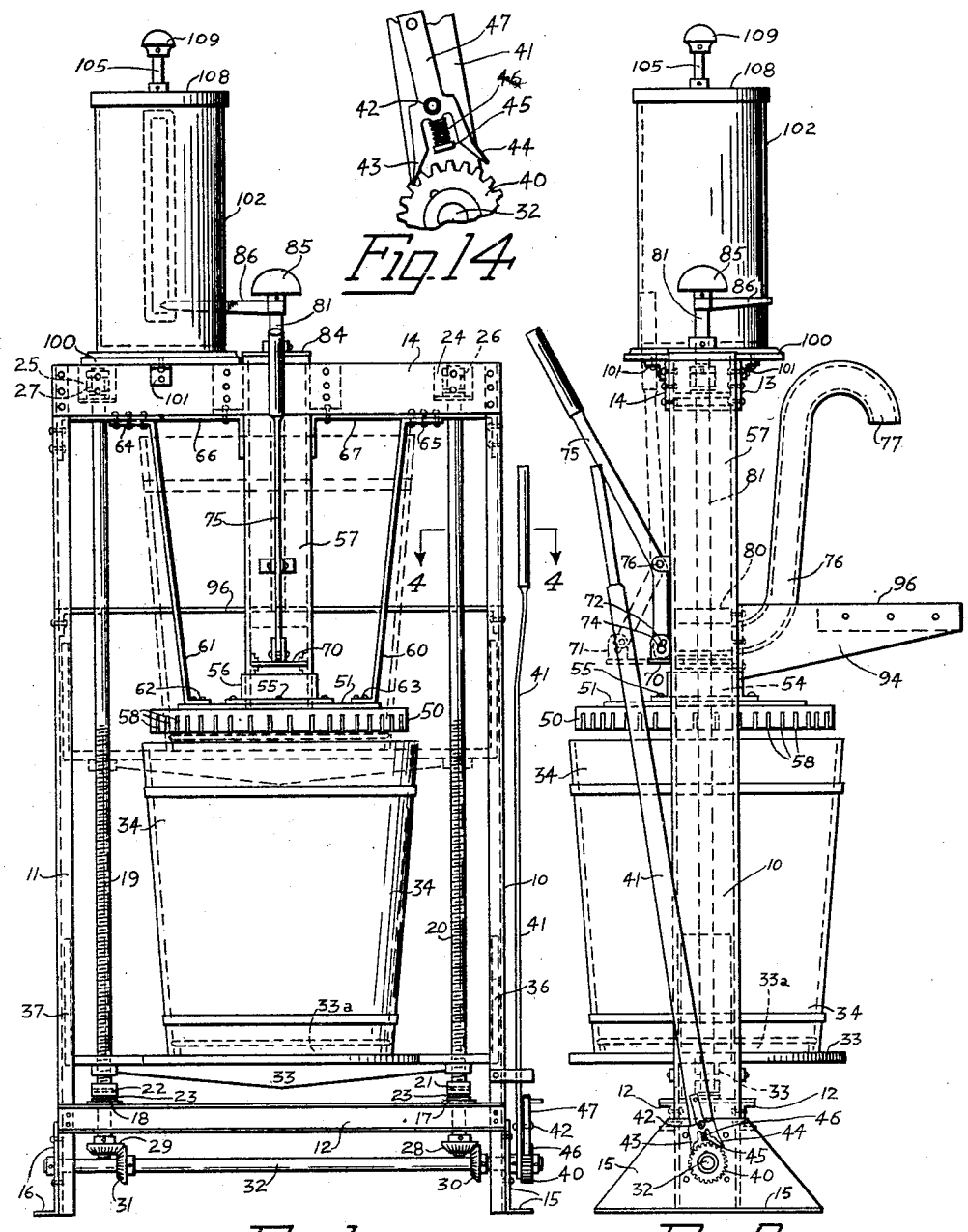

Oct. 20, 1931.   M. L. JACKSON ET AL   1,828,188
DISPENSING, MEASURING, AND COMPUTING DEVICE
Filed Sept. 2, 1930   3 Sheets-Sheet 3
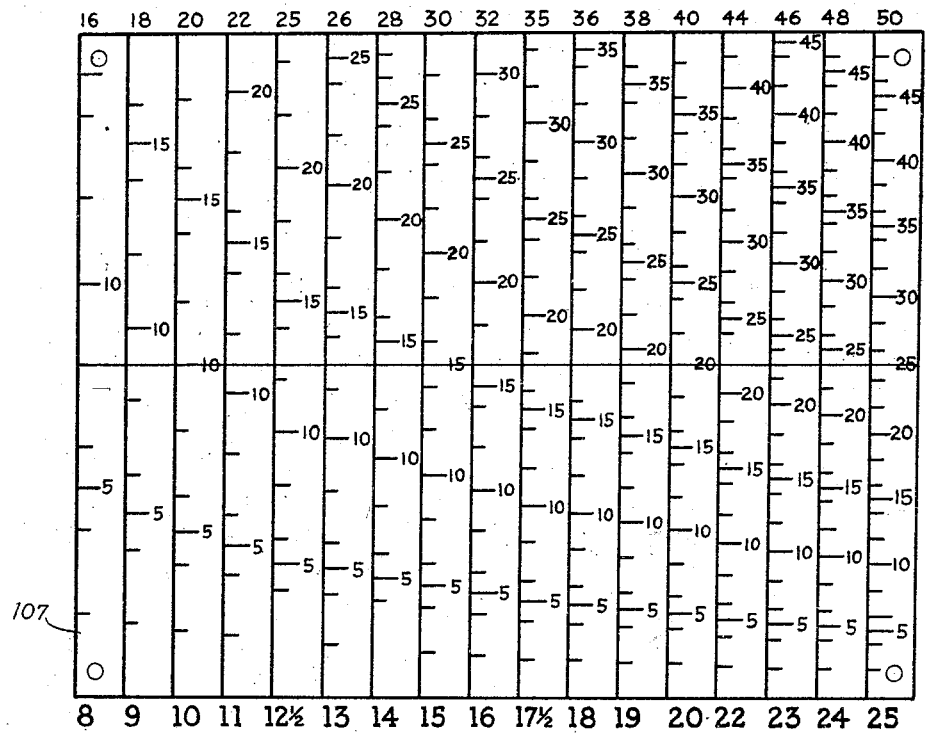
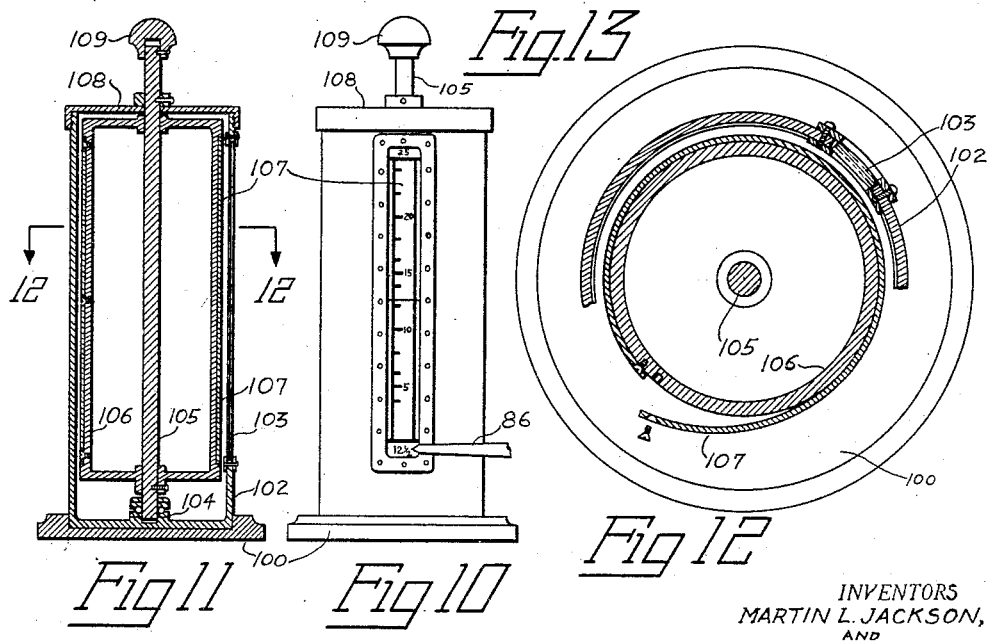
INVENTORS
MARTIN L. JACKSON,
AND
JOHN R. CARTER.
BY
ATTORNEY.

Patented Oct. 20, 1931

1,828,188

UNITED STATES PATENT OFFICE

MARTIN L. JACKSON AND JOHN R. CARTER, OF WINSTON-SALEM, NORTH CAROLINA

DISPENSING, MEASURING AND COMPUTING DEVICE

Application filed September 2, 1930. Serial No. 479,243.

This invention relates to a dispensing apparatus and more especially to a dispensing apparatus designed to dispense fluids from containers having a sidewall of uneven cross section, that is such as lard tubs, barrels and the like by providing a head member which is adapted to conform to the size of the container on the inside thereof and force the fluid out of the container together with means for measuring the fluid and expelling the same from the device.

An object of our invention is to provide a dispensing device adapted to dispense fluids from a container and to measure these fluids at the same time together with means for indicating the price at which the fluids are sold and to estimate the same on a convenient chart.

Another object of our invention is to provide a dispensing apparatus into which a container such as a lard bucket, barrel or other suitable container can be placed and the fluid can be forced therefrom and measured at the same time and the price estimated all in one operation.

Some of the objects of our invention having been stated other objects will appear as the description proceeds when taken in connection with the accompanying drawings, in which—

Figure 1 is a side elevation of our device;

Figure 2 is an edge view;

Figure 3 is a plan view;

Figure 4 is a detailed view taken along the line 4—4 in Figure 1;

Figure 5 is a detailed view of the bearing for the threaded rod;

Figure 6 is a view of another form of container with which our device can also be operated;

Figure 7 is a bottom plan view of the head member adapted to collect the fluid for expelling the same from the container;

Figure 8 is a cross-sectional view taken along the line 8—8 in Figure 7;

Figure 9 is a view of a device for contracting the head member;

Figure 10 is a side elevation of the registering device;

Figure 11 is a vertical cross-sectional view through Figure 10;

Figure 12 is a transverse cross-sectional view taken along the line 12—12 in Figure 11;

Figure 13 is a view of a chart adapted to be placed around the cylinder in the registering device.

Figure 14 is a fragmentary view of a double pawl carried by the driving lever.

Referring more particularly to the drawings the numerals 10 and 11 indicate the side frame members of our device which are secured together near the lower end thereof by means of a cross piece 12 and at the top thereof the members 10 and 11 are secured together by means of members 13 and 14 and to the lower ends of members 10 and 11 supports 15 and 16 are secured and on the top of member 12 suitable bearing members 17 and 18 are provided through which the threaded rods 19 and 20 pass and secured on these threaded rods are the bearing members 21 and 22 with the balls 23 located between the members 21 and 17 and the members 22 and 18 respectively.

The upper ends of these threaded rods 19 and 20 are rotatably secured in suitable blocks 24 and 25 mounted between the members 13 and 14 and suitable bearing members 26 and 27 are secured in these members 24 and 25 for rotatably supporting the threaded rods 19 and 20. On the lower end of the threaded rods 19 and 20 are bevel gears 28 and 29 which are adapted to mesh with bevel gears 30 and 31 on a transversely disposed shaft 32 which is rotatably mounted on the lower end of members 10 and 11. The threaded rods 19 and 20 penetrate the platform 33 by passing therethrough in a threaded manner, the holes in the member 33 being threaded through which the threaded rods 19 and 20 pass. This member 33 has a round member 33a to support the bottom of container 34, and at each end of the member 33 the upwardly projecting portions 36 and 37 are provided for sliding in suitable channels 38 formed on the inside surface of the members 10 and 11 to prevent sidewise tilting of the platform 33.

Fixedly secured on one end of the transverse shaft 32 is a toothed wheel 40 and loosely secured on the shaft 32 in close proximity to the toothed wheel 40 is a lever 41 which has pivotally mounted on pin 42 a double pawl having the portions 43 and 44 adapted to engage the wheel 40. A projection 45 extends from the lever 41 and supports a compression spring 46 which is adapted to hold either the pawl 43 or 44 in engagement with the wheel 40. The lever 47 is integral with the pawls 43 and 44 for operating the same to throw either the pawl 43 or 44 into engagement with the wheel 40, depending upon which direction it is desired to rotate the threaded rods 19 and 20.

A resilient head member 50 is fixedly secured in position in the framework by means of the head member 50 being secured to plate 51 by means of washer 52 and rivets 53, forming a passageway 54 in the central portion thereof and also secured to the plate 51 by means of suitable screws such as 55 is a member 56 to which is secured a delivery member 57 which in the drawings is shown in the form of being square in cross section. The collapsible head member 50 has a plurality of radial slots 58 cut therein to allow contraction and expansion of the head member 50 which is preferably made of rubber, though we desire it to be understood that it can be made of any suitable resilient material capable of withstanding the strain of operation.

To the plate member 51 the braces 60 and 61 are secured as at 62 and 63 and these brace members project upwardly and are secured to the members 13 and 14 as at 64 and 65 and the delivery member 67 projects upwardly and extends between the members 13 and 14 and is secured to these members 13 and 14 by means of suitable members 66 and 67 and also having members 68 and 69 secured on each side thereof. The member 57 has a slidable door 70 therein which is adapted to close the passageway 54 leading through the member 57 entirely when in the full line position shown in Figure 2. This door 70 has a projection 71 with a slot 72 therein which is adapted to receive pin 74 on the lower end of lever 75 which lever 75 is loosely pivoted as at 76 on the outer sidewall portion of the member 57. Immediately above the door 70 the member 57 has a hole cut in said member and covering this hole is a spout 76 which projects upwardly and has an opening 77 through which the fluid is adapted to be ejected. Immediately above the opening at the junction point of spout 76 with the member 57 is a plunger 80 which has a rod 81 connected thereto which projects upwardly through block 84 mounted on the members 13 and 14 and this member 81 has a knob 85 on the upper end thereof and a pointer 86 adapted to be associated with an indicating mechanism which will be presently described.

Secured to one side of the members 10 and 11 are the outwardly projecting members 94 and 95 to which is secured a shelf 96 adapted to support a container into which the fluid is adapted to be ejected from the end 77 of spout 76.

In case the head member 50 should be too large to be started into the top of a container such as 34 we provide the tool shown in Figure 9 for contracting the head to cause the same to pass inside the container 34 as container 34 is forced upwardly. This tool comprises a flexible strip of material such as a metal band 87 which has pivoted thereto as at 88 a link 89 which link in turn is pivoted as at 90 to lever 91 which is pivotally connected to the member 87 as at 92.

In Figure 6 we show barrel 93 to indicate that this device can also be operated with a container of this sort.

The registering device is mounted on a base 100 which is secured on top of the members 13 and 14 by means of a bracket such as 101 and this base has mounted therein a casing 102 which has a glass strip 103 vertically disposed in a slot in said casing and inside of this casing 102 is a bearing member 104 in which is rotatably mounted a shaft 105 and on this shaft 105 is secured a cylinder 106, a chart 107 being secured on said cylinder with any desired numerals thereon and a cap 108 fits over the top of the cylinder 102 and the rod 105 projects through said cap and rotates with relation to said cap 108. This rod 105 has a handle 109 mounted thereon so that the cylinder 106 can be turned to any convenient point.

Let us say that the chart 107 is turned to cause the column with the figures "12½" to show at the bottom thereof and with the pointer in position as shown in Figure 10 the plunger would be in lowermost position and when a pound of lard had been forced upward through the passageway 54 and up through member 57 it would raise the plunger 80 upward to the midway point and would cause the registering device to indicate that "12½¢" worth of lard had been forced into the member 57 above door 70 and a further ratcheting of the shaft 32 will cause the lard to be forced higher into the passageway 52 and shortly it will indicate that there has been "15¢" worth of lard forced out of the container and ready to be discharged into a suitable pail and in this way at all times the operator can ascertain the amount of fluid which has been expelled from the device but not delivered to the pail of the consumer. When the proper amount of material has been forced to the full line position shown in Figure 2 and the door 70 closes the passageway 52 in member 57 the handle 85 is pushed downwardly to normal position and this forces the lard up through the spout 76 and out through the opening 77 at the end thereof into the pail of the consumer located on shelf 96. The fact that the lard is rather slow flowing will mean that it will not go up through spout 76 until the plunger 80 is forced downwardly to cause it to do so and of course it is understood that the spout 76 in normal operation is full of lard at all times.

In the drawings and specifications we have set forth a preferred embodiment of our invention, and although specific terms are employed, they are used in a generic and descriptive sense only, and not for purposes of limitation, the scope of our invention being set forth in the appended claims.

We claim:

1. In a dispensing device, a framework, a platform in said framework adapted to support a container, means for raising and lowering said platform with said container, an expansible head member mounted in a fixed position in said framework, a member fixed to said member and to said framework and having a passageway therein, a spout member connected to said member and having a passageway therein having communication with the passageway in said first member, a plunger mounted in said passageway in said first member, a gate member adapted at times to close said first passageway, an indicating member associated with said plunger member, a chart associated with said indicator member to indicate the amount of fluid in said first passageway, means for elevating said platform and said container and thereby forcing the fluid into said first passageway, the plunger being adapted to force the fluid in said first passageway out through said spout when said gate is closed.

2. In a dispensing device for fluids and the like, a framework, a platform adapted to support a container, means for elevating and lowering said platform, a resilient head member adapted to fit in the said container, a hollow member fixedly secured to said head member, a spout member associated with said hollow member and having a passageway therein which communicates with the passageway in said hollow member, a plunger member mounted in said hollow member, an indicating member associated with said plunger, means for closing said passageway and for forcing fluids contained in said passageway out through said spout, and means associated with said plunger for indicating the amount of fluid in said passageway.

3. In a dispensing device, a framework, a platform mounted in said framework, means for raising and lowering said platform, a resilient head member adapted to be fitted into said container, a member having a passageway therein leading to said head member, a spout member connected to said member having a passageway therein, a plunger mounted in said passageway, said plunger being adapted to be raised when fluid is forced into said passageway, means for closing said passageway below said spout member, said plunger when forced downwardly being adapted to expel fluids confined above said closing means out through said spout member, and means for indicating the amount and value of the fluid contained in said passageway at a given time.

4. In a dispensing device for the lard and the like, a framework, a platform adapted to support a lard container, means for elevating said platform, a resilient head member adapted to be fitted into the upper end of said container, said head member being fixedly secured in said framework, a member secured to said head member and to said framework and having a passageway therein, a plunger mounted in said passageway, a spout member leading from said passageway, a gate member in said passageway, said plunger being adapted to force the fluid out of said passageway through said spout member when said gate is closed, means for indicating the amount of fluid in said passageway at the given time, and also for indicating the value of said fluid in said passageway at a given time.

5. In a dispensing device, a framework, a platform adapted to support a container, means for elevating said platform, a head member fixedly secured in said framework, said head member being resilient to accommodate itself to the inside contour of the container, a member secured to said head member and having a passageway therein, means for closing said passageway at a given point, a spout member leading to said passageway immediately above said given point, a plunger mounted in said passageway, said plunger being adapted to expel fluid from said passageway after said gate member has been closed, indicator member associated with said plunger, chart associated with said indicator member, said chart and indicator member being adapted to indicate at a given time the amount of fluid contained within the passageway and also the value of said amount of fluid.

In testimony whereof we affix our signatures.

MARTIN L. JACKSON.
JOHN R. CARTER.